US005442380A

United States Patent [19]

McCormick

[11] Patent Number: 5,442,380

[45] Date of Patent: Aug. 15, 1995

[54] MARKING AND COUNTING IMPLEMENT

[76] Inventor: Erik J. McCormick, 1509 W. Temple St., Chandler, Ariz. 85224

[21] Appl. No.: 266,947

[22] Filed: Jun. 27, 1994

[51] Int. Cl.[6] .......................... G01D 15/16; G01D 7/00

[52] U.S. Cl. .............................. 346/14 MR; 401/195; 346/143; 377/1

[58] Field of Search .................. 346/14, 143; 401/195, 401/194; 377/1

[56] References Cited

U.S. PATENT DOCUMENTS 4,768,040 8/1988 Pipkin et al. ...................... 346/14 R

*Primary Examiner*—Joseph W. Hartary
*Assistant Examiner*—Sterlon R. Mason
*Attorney, Agent, or Firm*—John D. Lister

[57] ABSTRACT

A marking and counting implement comprises a tubular housing for holding a marking implement, such as a highlighter. One end of the tubular housing has an aperture through which the marking end of the marking implement extends. The other end of the housing is closed and has a switch which is activated by the marking implement when a certain activating pressure is applied to the switch by the marking implement. Typically, a resilient means, such as a spring, keeps the marking implement from activating the switch until the activating pressure is applied to the switch by pressing the marking end of the marking implement against a surface. The switch is connected to a counter whereby, when sufficient pressure is exerted on the switch by the marking implement to activate the switch, a count is recorded. Thus, the marking and counting implement can be used for both marking and counting.

8 Claims, 2 Drawing Sheets

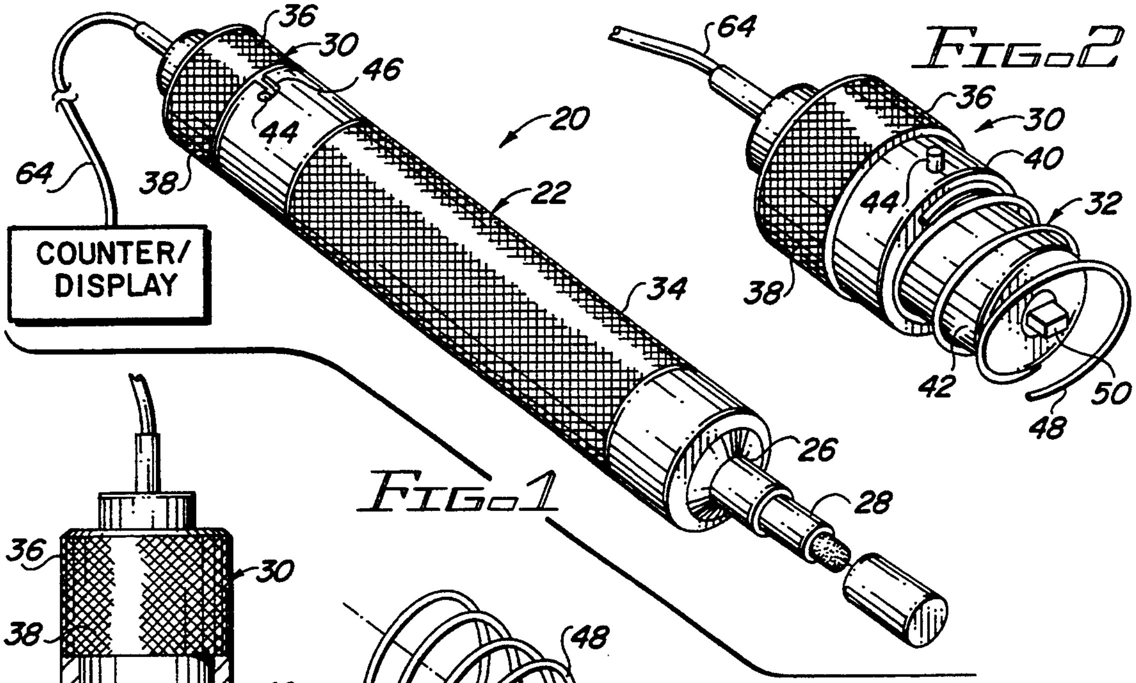
FIG. 1
FIG. 2
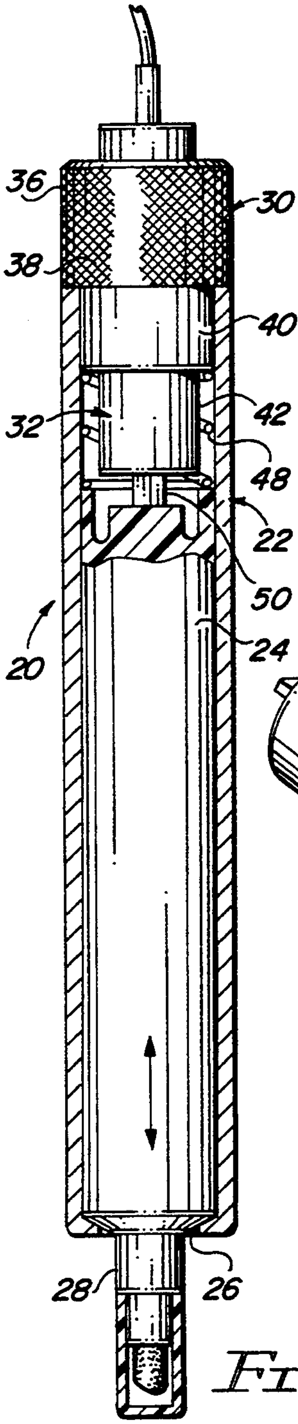
FIG. 3
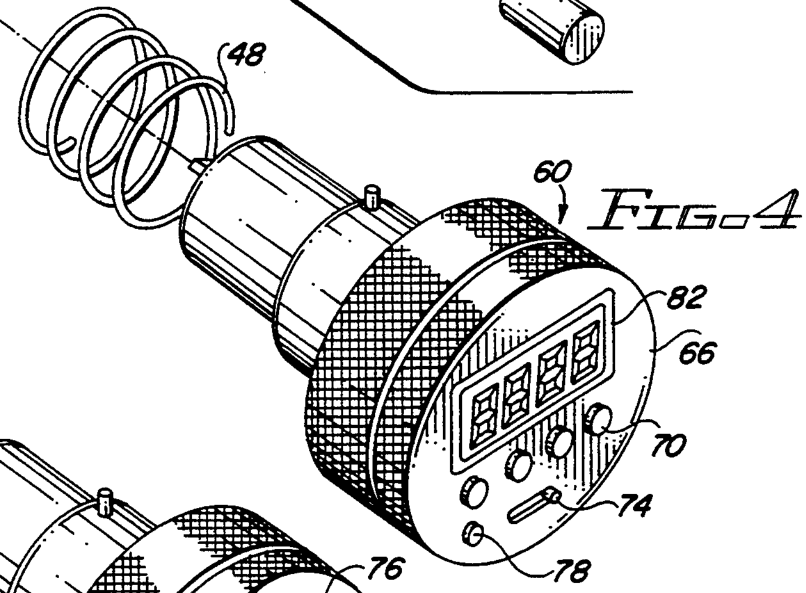
FIG. 4
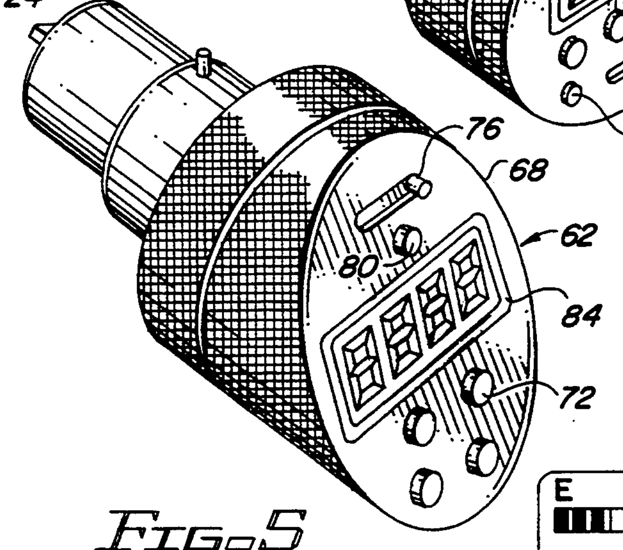
FIG. 5
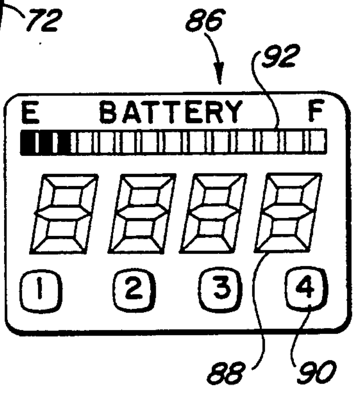
FIG. 6

MARKING AND COUNTING IMPLEMENT

BACKGROUND OF THE INVENTION

The present invention is directed to a marking and counting implement and preferably, to a marking and counting implement which can use highlighter pens or similar marking implements to both mark and write on plans and other papers or documents and count items on such papers or documents.

There are many applications where a person desires to both write, highlight or otherwise mark a paper, plan or document and count items on the paper, plan or document. Building construction is one field in which a user frequently desires to mark and/or write on a document and also count items on the document. In building construction, the contractor typically marks and/or writes on a plan or blueprint and counts items, such as electrical outlets, on a plan or blueprint to estimate a job for bidding.

Currently, there are ball point counting pens in use which have a switch that is activated when the counting pen contacts the surface of a plan, blueprint, paper or other document to complete an electrical circuit and send a signal which registers a count on a counter. However, the counting pen activates the switch on every contact so that the counting pen can not be used for marking or writing on a document without activating the switch. Thus, currently, the counting pen is used to count items on a plan or other document and a separate pen or other marking implement is used to mark or write on the document without effecting a count. The present invention is directed to a marking and counting implement which solves this problem of the prior art by permitting the same implement to be used for marking and writing on a document without effecting a count and for marking and writing on a document while effecting a count.

SUMMARY OF THE INVENTION

The marking and counting implement of the present invention comprises a tubular housing for holding a marking implement, such as, a highlighter, a felt tip pen, or the like. The tubular housing has a central aperture in one end through which the marking end of the marking implement extends. The other end of the tubular housing is closed by an easily removable end cap which has a switch mechanism incorporated therein adapted to be engaged by and activated by the upper end of the marking implement. A resilient means, such as a spring, keeps the marking implement from activating the switch mechanism unless at least a certain minimum activating pressure is applied by the upper end of the marking implement to the switch mechanism.

The activating pressure required to activate the switch mechanism is greater than the pressure required to cause the marking implement to mark so that the marking implement can be used for marking or writing on a surface without activating the switch mechanism. To activate the switch mechanism, the marking end of the marking implement must be pressed against the surface by the user with a pressure exceeding the pressure required to mark or write on the surface with the marking implement. Thus, the marking implement can be used to both mark and write on a surface and to activate the switch mechanism to effect a count by intentionally pressing the marking end of the marking implement against the surface.

The switch mechanism is part of an electrical circuit and the activation of the switch mechanism by the marking implement registers a count on a counting unit that is either integral with the marking and counting implement or a separate unit, such as, a conventional personal computer. Thus, the marking and counting implement of the present invention provides a single implement that can be used to mark and write on a surface without effecting a count and also, to effect a count of items on the surface by pressing the marking and counting implement against the surface with a force sufficient to activate the switch mechanism whenever a count is desired.

When counting different sets of items on a plan, blueprint or other surface, a user, such as a contractor, normally marks different item sets with different colors to distinguish the item sets being counted from each other. By providing the marking and counting implement of the present invention with an easily attachable and detachable upper end cap, highlighter pens and other marking pens of different colors can be readily and quickly changed by the user to facilitate the marking of different item sets with different colors as the items are being counted. Thus, the present invention not only provides a marking and counting implement which can be used to mark and write on a surface without effecting a count and to mark on a surface while effecting a count, but the marking and counting implement of the present invention also provides a marking and counting implement which permits the user to readily and quickly change the color of the marking pen used in the marking and counting implement.

BRIEF DESCRIPTION OF THE DRAWINGS

FIG. 1 is a perspective view of the marking and counting implement of the present invention.

FIG. 2 is a perspective view of a first embodiment of the end cap of the marking and counting implement of the present invention which includes a switch mechanism.

FIG. 3 is a longitudinal cross section through the marking and counting implement of the present invention with a highlighter marking implement mounted within the marking and counting implement.

FIG. 4 is a perspective view of a second embodiment of the end cap of the marking and counting implement of the present invention which includes a switch mechanism and an integral counting and LCD display unit.

FIG. 5 is a perspective view of a third embodiment of the end cap of the marking and counting implement of the present invention which includes a switch mechanism, an integral counting and LCD display unit, and an inclined display surface.

FIG. 6 is an enlarged view of an LCD display that can be used on the counting and LCD display units of FIGS. 4 and 5.

DESCRIPTION OF THE PREFERRED EMBODIMENTS

Figure 7:
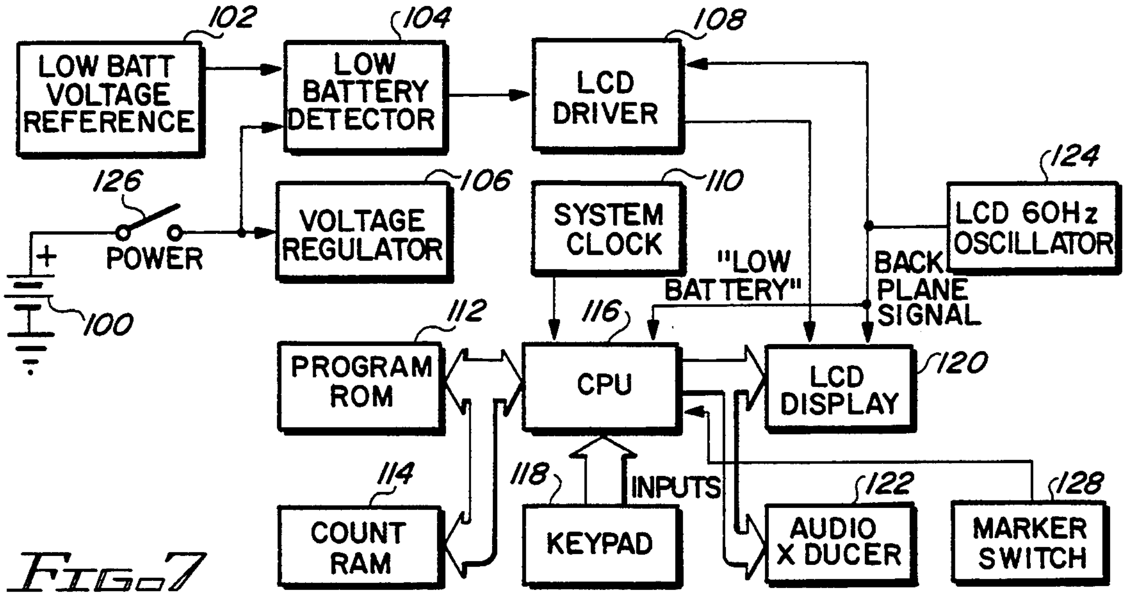
FIG. 7 is a block diagram of an electrical circuit that can be utilized in the integral counting and LCD display units of FIGS. 4 and 5.

FIG. 1 is a perspective view of the marking and counting implement 20 of the present invention. The marking and counting implement 20 of the present invention comprises a tubular housing 22 for holding a marking implement 24. The tubular housing 22 is closed at its lower end except for a centrally located aperture 26 through which the marking end 28 of the marking implement 24 extends when the marking and counting implement 20 is loaded with the marking implement 24 and ready for use. The upper end of the tubular housing 22 of the marking and counting implement 20 is typically closed by an easily removable end cap 30 which has a switch mechanism 32 incorporated therein.

The tubular housing 22, including the end cap 30, is typically made of black anodized steel or aluminum, plastic, or another suitable material commonly used in the fabrication of pens, mechanical pencils and other marking implements. As shown in FIG. 1, a central portion 34 of the outer surface of the tubular housing 22 can be knurled to facilitate the gripping of the marking and counting implement by the user when the marking and counting implement 20 is being used to mark, write and/or effect a count. As shown in FIGS. 1, 2 and 3, the outer surface 36 of an upper portion 38 of the end cap 30 can also be knurled to facilitate the gripping of the end cap by the user when the end cap 30 is being mounted on or removed from the tubular housing 22.

As best shown in FIG. 3, the inside diameter of the tubular housing 22 is, preferably, substantially equal too but somewhat greater than the outside diameter of the marking implement 24 used in the marking and counting implement 20 so that a snug sliding fit is formed between the marking implement 24 and the tubular housing 22. In the embodiment shown in FIG. 3, the tubular housing 22 is designed to accommodate a standard, commercially available, highlighter marking implement such as a "MAGIC MARKER" pen or marking implement. Thus, the marking and counting implement 20 can be used with different colored highlighter marking pens for marking, writing and/or effecting a count of items on a document and, since the end cap 30 is easily secured to and detached from the tubular housing 22, the different color highlighter pens can be easily and quickly substituted for each other in the marking and counting implement 20.

As shown in FIGS. 1, 2 and 3 the end cap 30, in addition to the upper portion 38, includes a mid-portion 40 and a lower portion 42. The mid-portion 40 of the end cap 30 has an external diameter substantially equal to but somewhat less than the internal diameter of the tubular housing 22 and forms a snug sliding fit with the interior surface of the tubular housing 22. The end cap 30 and the upper portion of the tubular housing 22 are provided with a quick release locking mechanism comprising a locking pin 44 on the mid-portion 40 of the end cap 30 which is received in an "L" shaped slot or channel 46 of the tubular housing 22 when the end cap 30 is mounted on the tubular housing 22. To mount the end cap 30 on the tubular housing 22 the lower portion 42 and the mid-portion 40 of the end cap 30 are inserted into the upper end of the tubular housing 22 and the end cap is then twisted or rotated relative to the tubular housing 22 to lock the end cap in place. The end cap 30 is removed from the tubular housing 22 by merely rotating the end cap relative to the tubular housing and sliding the mid-portion 40 and lower portion 42 axially out of the tubular housing 22. Thus, different colored highlighter marking pens and different marking implements can be readily and quickly substituted for one another in the marking and counting implement 20.

As shown in FIGS. 2 and 3, the lower portion 42 of the end cap 30 is smaller in diameter than the mid-portion 40 of the end cap and has a helical spring 48 mounted thereon for engaging the upper end of the highlighter marking implement 24. A plunger 50 of the switch mechanism 32 contained within the end cap 30 extends down from the end cap and, as shown in FIG. 3, engages a central portion of the upper end of the highlighter marking implement 24 mounted in the marking and counting implement 20.

The force exerted on the upper end of the highlighter marking implement 24 by the spring 48 is sufficient to permit the highlighter marking implement 24 to be pressed against a surface with a force sufficient to cause the highlighter marking implement 24 to mark or write on a surface without depressing the plunger 50 to close the contacts within the switch mechanism 32 and complete the electrical circuit used to send a count signal to a counting and display unit. To register a count on a counting and display unit, the marking end 28 of the highlighter marking implement 24 in the marking and counting implement 20 is pressed against the surface with a force greater than the force required to cause the marking implement 24 to mark or write and sufficient to compress the spring 48 and depress the plunger 50 to close the contacts of the switch mechanism 32 and generate the count signal which is transmitted to the counting and display unit. When the pressure applied to the marking end 28 of the marking implement 24 by pressing the marking implement against the surface is released, the spring 48 returns the marking implement to the extended position shown in FIG. 3 and the plunger 50, which is spring loaded, returns to the position shown in FIG. 3 opening the contacts within the switch mechanism 32. The marking and counting implement 20 is now ready to mark or write without effecting a count or to effect another count by pressing the marking end of the marking implement 24 against the surface with sufficient force to again compress the spring 48 and depress the plunger 50 to close the contacts on the switch mechanism 32 and generate another signal to the counting and display unit. In one embodiment of the present invention, a spring having a nominal 5.69 pound per inch compressive resistance has been used for the spring 48 and a PANASONIC EVQ-Q8B11K push button switch has been used for the switch mechanism 32.

In the preferred embodiments of the present invention, the switch mechanism, as shown in FIGS. 1 to 5, comprises a conventional, relatively inexpensive switch 32 with a spring loaded plunger 50 and a separate spring 48 which exerts a sufficient force on the upper end of the highlighter marking implement 24 to allow the highlighter marking implement to be used to mark or write without activating the switch mechanism. However, it is also contemplated that a switch could be used in the marking and counting implement 20 wherein the spring of a spring loaded plunger (similar to plunger 50) in the switch would be strong enough to exert a force on the upper end of the highlighter marking implement to permit the highlighter marking implement to be used for marking or writing without closing the switch contracts. In any of the embodiments of the present invention, the marking and counting implement 20 allows the user to write or mark a surface, such as a document, by pressing the marking implement 24 against the surface with a first pressure sufficient to cause the marking implement to mark without activating a switch mechanism and to effect a count with the same marking and counting implement 20 by pressing the marking implement against the surface with a second, greater pressure or force which is sufficient to cause the marking implement to mark or write and activate the switch mechanism.

FIGS. 4 and 5 show end caps 60 and 62, respectively, which are each mounted on the tubular housing 22 in the same way as the end cap 30 and which each have a switch and helical spring. However, instead of having an electrical lead wire 64 connected to a separate counting and display unit, such as a personal computer, the end caps 60 and 62 each contain an integral counting and LCD display unit 66 and 68 respectively. As shown in FIGS. 4 and 5, the counting and LCD display units each have four counting channels which may be used to register the counts. Thus, the faces of the counting and display units 66 and 68 each have four conductive rubber keypads 70 and 72 respectively; a power slide switch 74 and 76 respectively; a reset button 78 and 80 respectively; and an LCD display 82 and 84 respectively.

FIG. 6 shows a typical LCD display 86 that can be used with the counting and display units 66 and 68 of FIGS. 4 and 5. The LCD display includes a count display 88; four channel indicator lights 90 to indicate which counting channel is activated; and a low battery indicator 92 to warn the user of a possibly failing battery.

Figure 8:
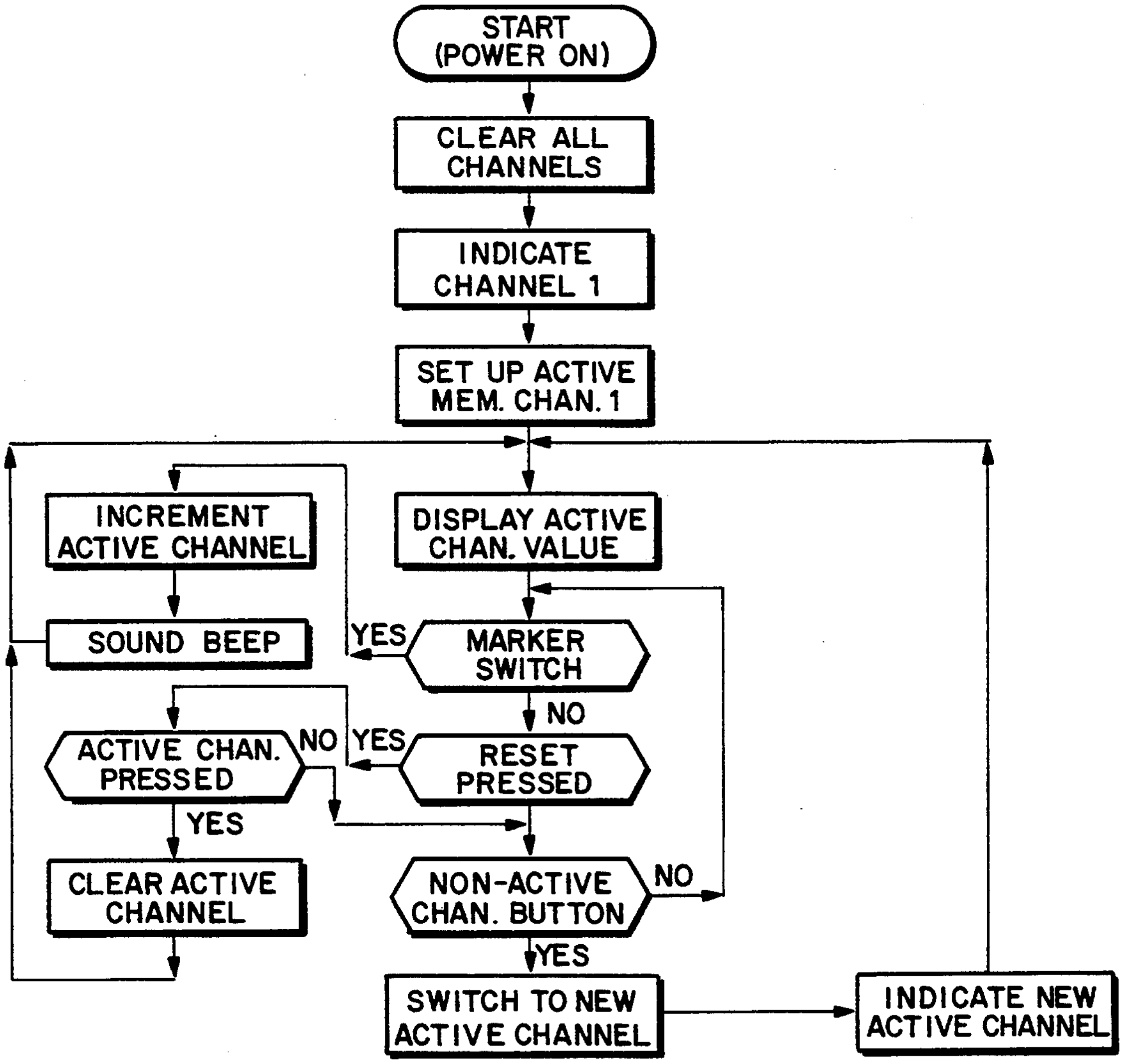
FIG. 8 is a block diagram of a computer software program that can be utilized in the integral counting and LCD display units of FIGS. 4 and 5 or in a separate, conventional computer connected to the marking and counting implement of the present invention.

While the number of counting channels used on the counting and display units can vary, as discussed above, the counting and display units 66 and 68 typically have four counting channels which may be used to register the counts. As shown in FIG. 8, which is a diagram of a preferred software program for the counting and display units 66 and 68, the four channels may be switched during operation to reset, review or continue with the count being recorded on any of the four channels. To switch the count recording from one channel to another one channel is deactivated and another channel is activated by pressing the keypad of the channel to be activated. An active channel may be reset by pressing the reset button 78 or 80 of the counting and LCD display unit while pressing the active channel keypad simultaneously. By requiring the reset button and the active channel keypad to be pressed at the same time, erroneous channel resets are prevented. An active channel effects a count each time the switch mechanism 32 is activated by pressing the marking end of the marking implement against a surface with sufficient force to close the contacts of the switch mechanism. An audio transducer also emits a brief audible tone burst to indicate that a count has been registered on the active channel.

As shown in FIG. 6, the counting and LCD display unit may count up to 9,999 marks per channel and a total of 39,996 marks may be registered on the counting and LCD display unit. The counting and LCD display unit shown and described herein automatically resets itself to a count of zero on all four channels at each power up.

FIG. 7 illustrates a preferred electrical circuitry for the counting and LCD display units 66 and 68. As shown in the circuit diagram of FIG. 7, the preferred electrical circuit of the counting and display units 66 and 68 comprise fifteen components in a separated or integrated circuit. The components of the circuit are a power source 100; a low battery reference voltage 102; a low battery comparator/detector 104; a voltage supply regulator 106; an LCD driver 108; a system clock 110; a permanent program memory (a Read-Only Memory or ROM) 112; a count memory (a Random Access Memory or RAM) 114; a CPU (Computer Processing Unit) 116; a keypad 118; a LCD (Liquid Crystal Display) 120; an audio transducer 122; a LCD oscillator 124; a power switch 126; and a marker switch 128.

The power source 100 is a common portable battery cell, such as those used in cameras, calculators and watches. If the cell voltage has less EMF than required by the logic circuitry, the voltage regulator 106 would increase the voltage using conventional inductive and capacitive methods. If the cell voltage has more EMF than required by the logic circuitry, the voltage regulator would decrease the voltage using conventional inductive and capacitive methods. The voltage regulator used may be a linear type; "step up" switching type; or a "step down" switching type; depending on the battery life desired, the type of battery used and cost considerations.

The low battery reference voltage 102 is a stable, specified reference voltage. The low battery comparator/detector 104 compares the reference voltage to the battery voltage and sends a signal to the LCD driver 108. If the signal indicates a battery voltage that is below the reference voltage, the LCD driver 108 produces a signal 180° out of phase with the signal from the LCD 60 Hz back plane oscillator and a signal is sent to the LCD display 120 indicating a low battery condition. If the signal indicates a battery voltage that is above the reference voltage, the LCD driver 108 produces a signal in phase with the signal from the LCD 60 Hz back plane oscillator and the low battery condition is not indicated on the LCD display 120.

The system clock 110 is used to provide basic timing to the CPU 116 for synchronizing the logical functions of the CPU. The program memory (ROM) 112 is used to store the operating program for the counting and LCD display unit, such as the program outlined in FIG. 8. The count memory (RAM) 114, is used to store the current count value for all four of the count channels. The CPU 116 reads the operating program and executes the commands through the inputs and outputs connected to the CPU effect the operation of the counting and LCD display unit. The keypad 118, including the reset button, is used by the operator to set the channel selection and to reset the channels when initiating a new count.

The LCD display 120 shows the count of the channel currently activated as well as which channel is activated. The LCD display, such as the display of FIG. 6, also indicates whether or not there is a low battery condition based on the signal from the LCD 60 Hz oscillator 124. The audio transducer 122 provides an audio indication to the user when the marker switch 128 has been activated to register a count on the LCD display 120. The power switch 126 connects or disconnects the circuitry of the counting and LCD display units to the battery power source.

In describing the invention certain embodiments have been used to illustrate the invention and the practice thereof. However, the invention is not limited to these specific embodiments as other embodiments and modifications within the spirit of the invention will readily occur to those skilled in the art on reading this specification. The invention is thus not intended to be limited to the specific embodiments disclosed, but is to be limited only by the claims appended hereto.

What is claimed is:

1. A marking and counting implement comprising:

a tubular housing for holding a marking means having a marking end and an opposite end; said tubular housing having a first end with an aperture therein; said tubular housing having a second end closed by a removable end cap having a switch means therein;

a marking means for marking a surface when pressed against the surface with a first pressure; said marking means being slidably contained within said tubular housing and having a marking end extending through said aperture in said tubular housing and an opposite end in contact with said switch means;

said switch means having a spring means for preventing said switch means from being actuated by said marking means when said marking means is pressed against said surface with a pressure at or below said first pressure, for permitting actuation of said switch means by movement of said marking means when said marking means is pressed against the surface with a pressure above said first pressure, and for returning said marking means to an extended position when said marking means is not being pressed against the surface; said spring means engaging said opposite end of said marking means; and said switch means being part of an electrical circuit comprising a counter for registering a count when said switch means is actuated.

2. The marking and counting implement of claim 1, wherein: said counter is a computer electrically connected to said switch means.

3. The marking and counting implement of claim 1, wherein: said counter is integral with the marking and counting implement.

4. The marking and counting implement of claim 3, wherein: said counter has a plurality of counting channels whereby more than one set of items can be counted and recorded.

5. The marking and counting implement of claim 1, wherein: said switch means includes an electrical connection for connecting the marking and counting implement to a computer input.

6. The marking and counting implement of claim 1, wherein: said tubular housing accommodates a highlighter marking implement.

7. The marking and counting implement of claim 6, wherein: said second, closed end of said housing with said switch means is mounted on the tubular housing by a quick release means to permit the highlighter marking implement to readily replaced.

8. The marking and counting implement of claim 1, wherein: said counter is integral with the marking and counting implement; said counter is battery powered; and said counter has a plurality of counting channels whereby more than one set of items can be counted and recorded.

* * * * *